United States Patent [19]

Jones

[11] Patent Number: 5,933,081

[45] Date of Patent: Aug. 3, 1999

[54] DEVICE FOR AIDING IN THE LOCATION OF AN AUTOMOBILE

[75] Inventor: Cynthia C. Jones, Midwest City, Okla.

[73] Assignee: Antenna Buddies, Inc., Oklahoma City, Okla.

[21] Appl. No.: 09/072,909

[22] Filed: May 5, 1998

[51] Int. Cl.$^6$ .................................................. G08B 1/08
[52] U.S. Cl. ................ 340/539; 340/425.5; 340/825.49; 340/825.69; 116/28 R; 116/209; 116/173
[58] Field of Search ................................ 340/539, 425.5, 340/825.49, 825.36, 825.69, 825.72; 116/28 R, 209, 173

[56] References Cited

U.S. PATENT DOCUMENTS

| | | | |
|---|---|---|---|
| 3,506,956 | 4/1970 | Kolm et al. | 340/825.72 |
| 3,890,497 | 6/1975 | Rush | 116/173 |
| 3,895,348 | 7/1975 | Palermo | 116/173 |
| 4,143,368 | 3/1979 | Route et al. | 340/543 |
| 4,964,360 | 10/1990 | Henry | 116/28 R |
| 5,388,546 | 2/1995 | Lombard | 116/209 |

*Primary Examiner*—Donnie L. Crosland
*Attorney, Agent, or Firm*—R. William Graham

[57] ABSTRACT

A device for aiding in the location of an automobile which is located in a crowded parking lot includes an illuminable member which is readily connectable to the automobile, preferably to an externally extending antenna, a power supply device operably connected to the illuminable member for supplying power thereto to cause illumination of the illuminable member. The illuminable member may also include a remote controllable switch operably associated with the power supply device for initiating operation of the device of the present invention.

6 Claims, 2 Drawing Sheets

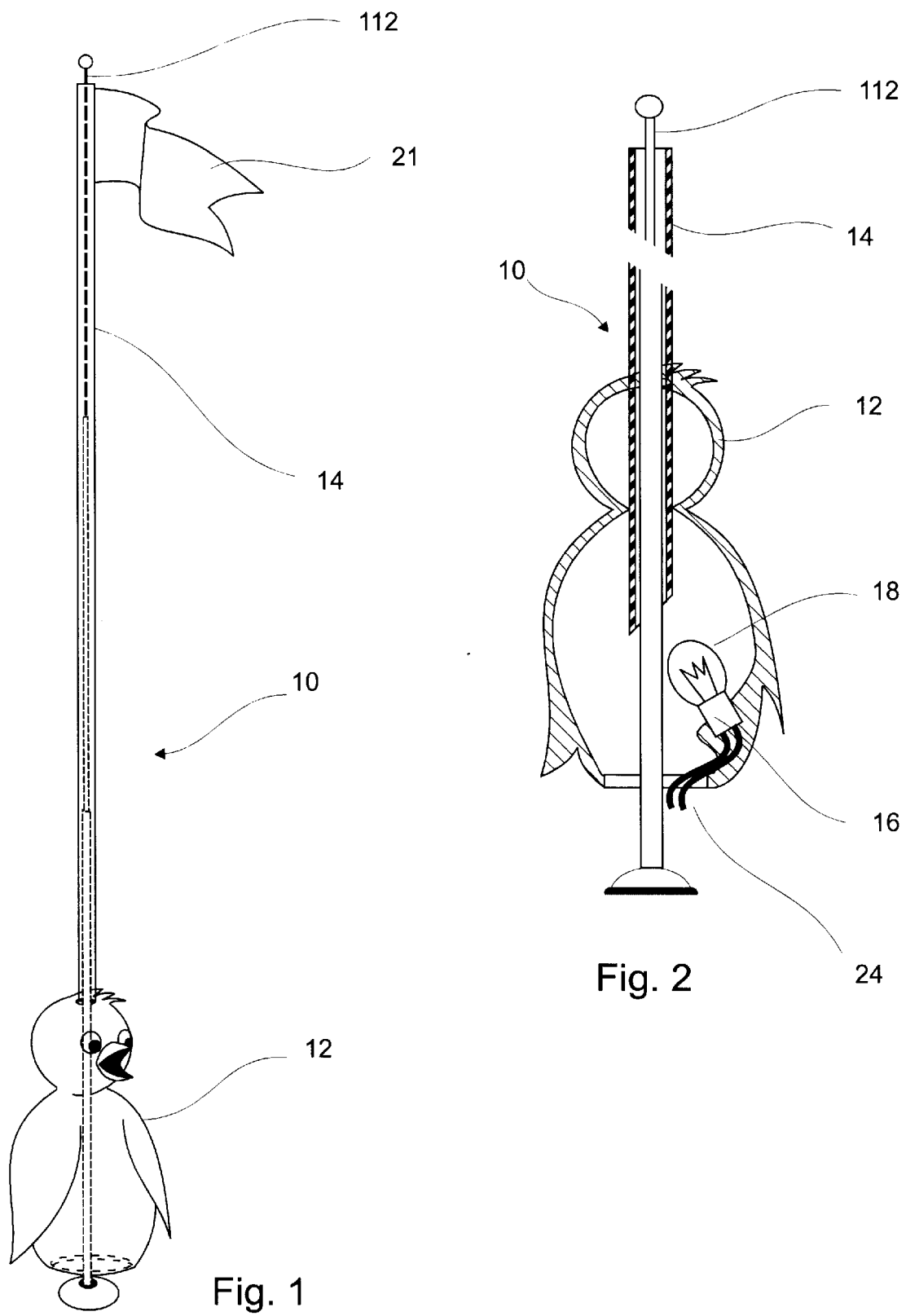

5,933,081

DEVICE FOR AIDING IN THE LOCATION OF AN AUTOMOBILE

BACKGROUND OF THE INVENTION

1. Field of the Invention

The present invention relates generally to a field of devices which aid in the location of an automobile wherein the same is located in heavily crowded parking lots or garages. More particularly, the present invention relates to a device for aiding in the location of an automobile by an illuminated member operably disposed on the automobile in a manner to readily permit visual sight from relatively large distances at any time of the day or night.

2. Related Art

With the ever increasing numbers of automobiles in urban areas, there is a high frequency for using large parking lots and garages. Many of these lots and garages are utilized at night or are dimly lit, e.g., covered or enclosed garages.

Heretofore, there have been attempts at providing ways for aiding in locating automobiles in crowded parking lots. Many of these lots or garages are marked with location signs to aid the driver in finding the location of their car upon return. Others have attached markers to their vehicles, such as a flag, in order to aid in the location of their vehicle. These other aids have met with limited success. In some circumstances, such as late in the evening, where there is insufficient light to view such aids, one's memory often fails to recall the location of the automobile and the driver is left to wander about to find their automobile. This poses a considerable security concern to many people.

Accordingly, there remains a need to overcome these problems in the field of automobile locating devices. There remains a need for an improved automobile locating device which overcomes these problems. There is also a desire to provide an automobile locating device which is entertaining.

BRIEF SUMMARY OF THE INVENTION

It is an object of the present invention to provide an improved automobile locating device.

It is another object of the invention to improve security for a driver by providing an automobile locating device with an illuminating member.

It is still another object of the present invention to provide a remote controllable automobile locating device.

Yet another object of the present invention is to provide an automobile locating device which is entertaining to the user and viewer.

Accordingly, the present invention is directed to a device for aiding in the location of an automobile which is located in one of a crowded parking lot and a garage includes an illuminable member which is readily connectable to the automobile, preferably an externally extending antenna, and a power supply device operably connected to the illuminable member for supplying power thereto to cause illumination of the illuminable member. The device may also include a remote controllable switch operably associated with the power supply device for initiating the same. The illuminable member may also includes a housing which is aesthetically configured and has a lighting device therein to cause the illumination of the illuminating member.

Other objects and advantages will be readily apparent to those skilled in the art upon viewing the drawings and reading the detailed description hereafter.

BRIEF DESCRIPTION OF THE DRAWINGS

FIG. 1 is a perspective view of the present invention.

FIG. 2 is a cross-sectional view of the present invention.

DETAILED DESCRIPTION OF THE INVENTION

Figures 3, 4:
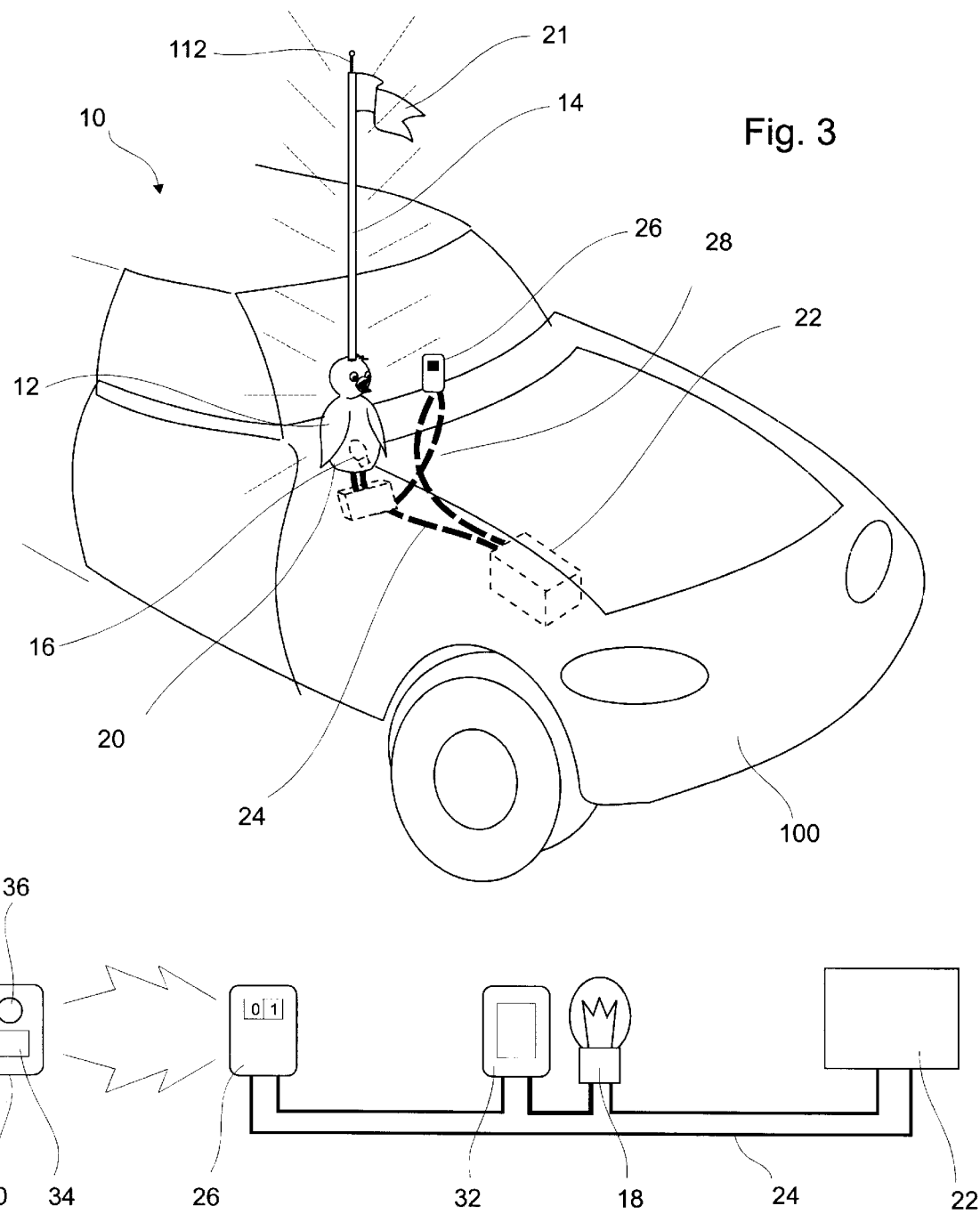
FIG. 3 is another perspective view of the present invention.
FIG. 4 is a schematic diagram of the present invention.

Referring now to the drawings, the device for aiding in the location of an automobile 100 is generally denoted by the numeral 10. The device 10 is disposed about an antenna 112 of the automobile 100.

The device 10 includes an illuminable member 12. The illuminable member 12 includes a fiber optic member 14 which is generally connected adjacent the antenna 112 and a light emitting device 16 preferably disposed adjacent a lower portion of the antenna 112. The fiber optic member 14 is preferably tubular and is designed in a manner to be slid about the antenna 112 and illuminated via the light emitting device 16 which is preferably disposed at a lower end of the fiber optic member 14 to permit substantial illumination thereof. The light emitting device 16 has a light 18 and housing 20 which is disposed about the light 18 and which is at least partially transparent to permit light therethrough. The light 18 can be of a suitable illumination power to cause substantial illumination of optic fiber member 14 and the housing 20. The housing 20 is configured in an aesthetically pleasing shape, such as that of a notable cartoon character, for example, thus adding an additional entertainment feature to the invention. While the housing 20 is disposed at the lower end of the optic fiber member 14, it is contemplated that the housing 20 can be modified with suitable retaining means for holding the housing at a desired position along the antenna 112. Additionally, a flag 21 or pennant can be connected to a top end of the fiber optic member 14.

A power supply device 22, such as a battery of the automobile, is operably connected to the illuminable member 12 by way of an electrical connection 24 for supplying power to the light 18 to cause illumination of the illuminable member 12. Alternatively, the power supply device 22 can be a smaller battery disposed in the housing 20 or possibly a small solar power cell. Other means for power supply will be readily apparent to those skilled in the art.

Operably connected to the illuminable member 12 is a switch 26 which is in turn operably interposed in line 24 via an electrical connection 28. The switch 26 is shown as located in the automobile 100, wherein the user can activate the illuminating member 12 prior to exiting the automobile 100 and deactivate the illuminating member 12 upon returning to the automobile 100. However, it is recognized by the inventor that a switch may be operably disposed on the housing 20, for example, for turning off and on the device 10.

Also, the device 10 may include a remote control 30 operably associated with the power supply device 22 and illuminating member 12. In this case, the illuminating member 12 includes a receiving device 32 operably connected to the switch 26 for enabling turning on and off the illumination. The remote control 30 includes a transmitting device 34 having a battery 36 for powering transmission of one of an on or off signal to the receiver 32.

It is also contemplated that the device 10 include an audio signaling device 36 which is activated by still another signal of the transmitting device 34. The audio signal can be of any suitable noise and is preferably complimentary to the character configuration of the housing 20.

The present invention therefore provides for an improved device for use in locating an automobile in a crowded parking lot or garage under normal and dimly lit visibility conditions. While the invention is shown and described as connecting to the antenna, it is contemplated that the support structure to which the device of the present invention attaches may comprise other structures as opposed to the antenna and that the same will be apparent to those skilled in the art. The above described embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their fill scope including any such modifications, derivations and variations.

What is claimed is:

1. A device for aiding in the location of an automobile having an externally extending antenna which is located in one of a crowded parking lot and garage, which includes:

an illuminable member which is readily connectable to the antenna, wherein said illuminable member includes an optic fiber member disposed about the antenna, partially transparent housing disposed about the antenna and which is configured in an aesthetically pleasing shape to provide an entertainment to the user, and a light emitting device disposed within said housing which provides a dual function of illumination to said housing and said optic fiber; and a power supply device operably connected to said illuminable member for supplying power to said illuminable member to cause illumination thereof.

2. The device for aiding in the location of an automobile of claim 1, wherein said illuminable member further includes a remote controllable switch operably associated with said power supply device for initiating said power device to cause illumination of said illuminable member.

3. The device for aiding in the location of an automobile of claim 1, wherein said optic fiber member is tubular and is disposable about the antenna.

4. The device for aiding in the location of an automobile of claim 1, which further includes at least one of a flag and pennant.

5. The device for aiding in the location of an automobile of claim 1, which further includes a sound emitting device operably associated with said power supply device.

6. The device for aiding in the location of an automobile of claim 2, which further includes a sound emitting device operably associated with said power supply device and is operatively responsive to said remote controllable switch.

* * * * *